(12) United States Patent
Mochizuki et al.

(10) Patent No.: US 8,999,437 B2
(45) Date of Patent: Apr. 7, 2015

(54) POWDER-ROLLING DEVICE AND POWDER-ROLLING METHOD

(75) Inventors: Chitoshi Mochizuki, Tokyo (JP); Tamotsu Oda, Tokyo (JP)

(73) Assignee: IHI Corporation (JP)

( * ) Notice: Subject to any disclaimer, the term of this patent is extended or adjusted under 35 U.S.C. 154(b) by 0 days.

(21) Appl. No.: 14/110,464

(22) PCT Filed: Apr. 9, 2012

(86) PCT No.: PCT/JP2012/059691
§ 371 (c)(1),
(2), (4) Date: Oct. 8, 2013

(87) PCT Pub. No.: WO2012/141137
PCT Pub. Date: Oct. 18, 2012

(65) Prior Publication Data
US 2014/0030430 A1     Jan. 30, 2014

(30) Foreign Application Priority Data

Apr. 14, 2011   (JP) .................................. 2011-090390

(51) Int. Cl.
| | | |
|---|---|---|
| *B05D 1/28* | (2006.01) | |
| *B05D 3/12* | (2006.01) | |
| *B05C 1/08* | (2006.01) | |
| *B22F 3/18* | (2006.01) | |
| *B22F 7/04* | (2006.01) | |
| *B23K 35/40* | (2006.01) | |
| *B23K 35/02* | (2006.01) | |

(52) U.S. Cl.
CPC ... *B05D 1/28* (2013.01); *B22F 3/18* (2013.01); *B22F 7/04* (2013.01); *B23K 35/40* (2013.01); *B23K 35/0244* (2013.01)

(58) Field of Classification Search
USPC .......... 427/194, 359, 428.1, 428.11; 118/112, 118/258
See application file for complete search history.

(56) References Cited

U.S. PATENT DOCUMENTS

| | | | |
|---|---|---|---|
| 5,620,489 A | 4/1997 | Tselesin | |
| 6,022,436 A * | 2/2000 | Koslow et al. | ................ 156/191 |
| 2003/0129302 A1* | 7/2003 | Chambers et al. | ............ 427/180 |
| 2005/0112278 A1* | 5/2005 | Obata et al. | .................. 427/231 |

FOREIGN PATENT DOCUMENTS

| | | |
|---|---|---|
| CN | 1145048 A | 3/1997 |
| JP | A-2001-068105 | 3/2001 |

(Continued)

OTHER PUBLICATIONS

International Search Report and Written Opinion mailed Jul. 10, 2012 in corresponding PCT International Application No. PCT/JP2012/059691.

(Continued)

*Primary Examiner* — Frederick Parker
(74) *Attorney, Agent, or Firm* — Ostrolenk Faber LLP

(57) ABSTRACT

The powder-rolling device (1) includes: a pair of rolling rolls (2) to attach powder material (Y) to a sheet-shaped base material (X) by pressure; a preliminary press roll (8) to press the powder material (Y) to a circumferential surface of a rolling roll (2) before the powder material (Y) is attached to the base material (X) by pressure; and a support device (10) supporting the preliminary press roll (8) movable, so that a load applied to the preliminary press roll (8) becomes equal to a set value which has been set beforehand.

6 Claims, 3 Drawing Sheets

(56) References Cited

FOREIGN PATENT DOCUMENTS

| | | |
|---|---|---|
| JP | 2002-212608 | 7/2002 |
| JP | 2005-139536 | 6/2005 |
| JP | B-3684935 | 8/2005 |
| JP | 4211576 | 1/2009 |
| JP | 2009-149960 | 7/2009 |
| JP | A-2009-235442 | 10/2009 |
| TW | 339288 | 9/1998 |
| TW | 200911444 A | 3/2009 |
| TW | 200936263 A | 9/2009 |

OTHER PUBLICATIONS

Office Action dated Nov. 13, 2013 issued in corresponding Taiwan Patent Application No. 101112583 with English translation.
Chinese Office Action dated Oct. 17, 2014 in corresponding Chinese Patent Application No. 201280017650.6 with Search Report (9 pages).

* cited by examiner

POWDER-ROLLING DEVICE AND POWDER-ROLLING METHOD

CROSS-REFERENCE TO RELATED APPLICATIONS

The present application is a 35 U.S.C. §§371 national phase conversion of PCT/JP2012/059691, filed Apr. 9, 2012, which claims priority to Japanese Patent Application No. 2011-090390, filed Apr. 14, 2011, the contents of which are incorporated herein by reference. The PCT International Application was published in the Japanese language.

TECHNICAL FIELD

The present invention relates to a powder-rolling device and a powder-rolling method.

BACKGROUND ART

In recent years, as a device used in the process of producing a clad sheet in which a clad layer is formed so as to be attached to the surface of a base material, a powder-rolling device to attach powder to the base material by pressure is proposed.

For example, Patent Document 1 discloses a powder-rolling device like this.

If described in more detail, the powder-rolling device includes a pair of rolling rolls disposed so as to be opposite to each other. In the powder-rolling device, the rolling rolls attach powder to the surface of the base material supplied to between the rolling rolls, by pressure, thereby forming a powder layer on the surface of the base material.

DOCUMENT OF RELATED ART

Patent Document

[Patent Document 1] Japanese Patent No. 4211576

SUMMARY OF INVENTION

Technical Problem

In the powder-rolling device, in order to stably supply powder material to between the rolling rolls, a preliminary press roll may be used to press the powder material to the circumferential surface of the rolling roll before the powder material is attached to the base material by pressure.

In a case where this preliminary press roll is used, usually, it is conceivable that the preliminary press roll is rotatably fixed so that the gap between the preliminary press roll and the rolling roll becomes constant, and the amount of supply of the powder material to be pressed to the circumferential surface of the rolling roll is controlled by regulating the rotation speed of the preliminary press roll.

However, for example, if powder grains having a larger grain diameter than the width of the gap between the preliminary press roll and the rolling roll enter the gap, a great load is temporarily applied to the preliminary press roll due to the counter force of the powder material in the vicinity of the position which the powder grains having a large grain diameter enter.

Generally, grains having a large grain diameter are removed from the powder material by classification using a screen or the like, and thereby the powder grains having a certain grain diameter or less are used. However, occasionally, grains having a large grain diameter may be mixed therein. In addition, powder grains may be agglomerated during the storage of the powder material after classification, and thereby agglomerated powder grains having a large grain diameter in appearance may be generated. Therefore, in the process of attaching the powder material to the base material by pressure, powder grains having a large grain diameter in appearance may enter between the preliminary press roll and the rolling roll.

That is, in the process of attaching the powder material to the base material by pressure, even though the powder material having a certain powder grain diameter or less is used, powder grains having a large grain diameter in appearance may enter between the preliminary press roll and the rolling roll. In this case, although it is temporary, a great load is applied to the powder material and to the preliminary press roll.

In this way, if a great load is temporarily applied to the powder material or to the preliminary press roll, the filling density of part of a powder layer may be increased excessively, the powder layer formed by the preliminary press roll pressing the powder material to the rolling roll. Therefore, the formation state of the powder layer may become unstable, and it may not be possible to stably form a powder layer having uniform thickness, and to properly attach the powder material to the base material by pressure.

The present invention aims to provide a powder-rolling device and a powder-rolling method in which a great load is prevented from being temporarily applied to the powder material or the preliminary press roll, the non-uniformity of the powder layer formed by the preliminary press roll is prevented, and thereby the powder material is properly attached to the base material by pressure.

Solution to Problem

According to a first aspect of the present invention, a powder-rolling device includes: a pair of rolling rolls to attach powder material to a sheet-shaped base material by pressure; a preliminary press roll to press the powder material which has been supplied onto a circumferential surface of a rolling roll, to the circumferential surface of the rolling roll, before the powder material is attached to the base material by pressure; and a support device supporting the preliminary press roll movable in a direction to approach the circumferential surface of the rolling roll and to be separated therefrom, so that a load applied to the preliminary press roll becomes equal to a set value which has been set beforehand.

According to a second aspect of the present invention, in the first aspect, the support device includes a pressure cylinder to press the preliminary press roll to the circumferential surface of the rolling roll.

According to a third aspect of the present invention, in the first aspect, the support device includes an elastic member to press the preliminary press roll to the circumferential surface of the rolling roll.

According to a fourth aspect of the present invention, in any one of the first to third aspects, the powder-rolling device further includes: roll chocks supporting the rolling rolls; and a support frame supporting the roll chocks slidably. In addition, the support device is attached to the support frame.

According to a fifth aspect of the present invention, a powder-rolling method includes: a first step of supplying powder material to a circumferential surface of at least one rolling roll of a pair of rolling rolls; a second step, after the first step, of pressing the powder material which has been supplied onto the circumferential surface of the rolling roll, to the circumferential surface of the rolling roll, by using a preliminary press roll; and a third step, after the second step, of inserting a sheet-shaped base material together with the powder material between the pair of rolling rolls, thereby attaching the powder material to the base material by pressure. In addition, in the second step, the preliminary press roll is moved so as to approach the circumferential surface of the rolling roll and to be separated therefrom, so that a load applied to the preliminary press roll becomes equal to a set value which has been set beforehand.

According to the present invention, when the powder material which includes the powder grains having a large grain diameter as single or the powder grains having a large grain diameter in appearance by agglomeration (hereinafter referred to as "the powder material having a large grain diameter") is supplied to between the rolling roll and the preliminary press roll, the preliminary press roll is moved in the direction to be separated from the rolling roll, by the support device, depending on the grain diameter of the powder material, so that the load applied to the preliminary press roll becomes the set value which has been set beforehand.

Therefore, even if the powder material having a large grain diameter is supplied between the rolling roll and the preliminary press roll, the load applied to the powder material and the preliminary press roll can be prevented from being temporarily increased due to the powder material having a large grain diameter.

Effects of Invention

According to the present invention, a great load can be prevented from being temporarily applied to powder material or a preliminary press roll, and thereby a powder layer formed by the preliminary press roll can be prevented from becoming non-uniform. Therefore, the powder material can be properly attached to a base material by pressure.

DESCRIPTION OF EMBODIMENTS

Figure 1A:
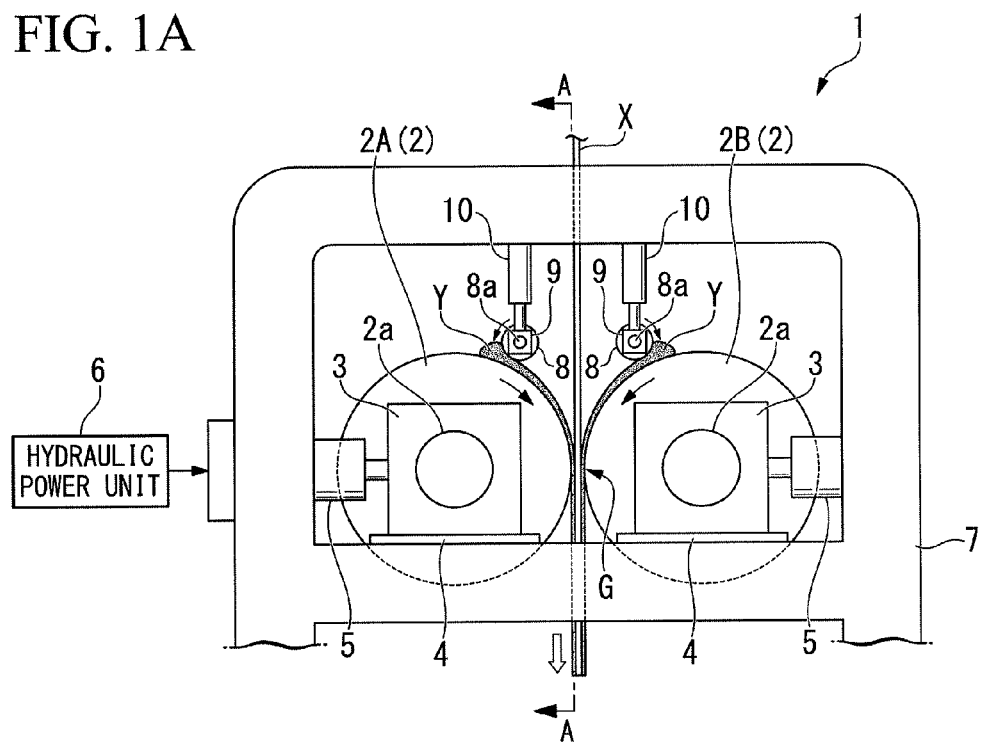
FIG. 1A is a schematic configuration diagram showing a main section of a powder-rolling device in an embodiment of the present invention, viewed from the rotation axis direction of a rolling roll.
Figure 3A:
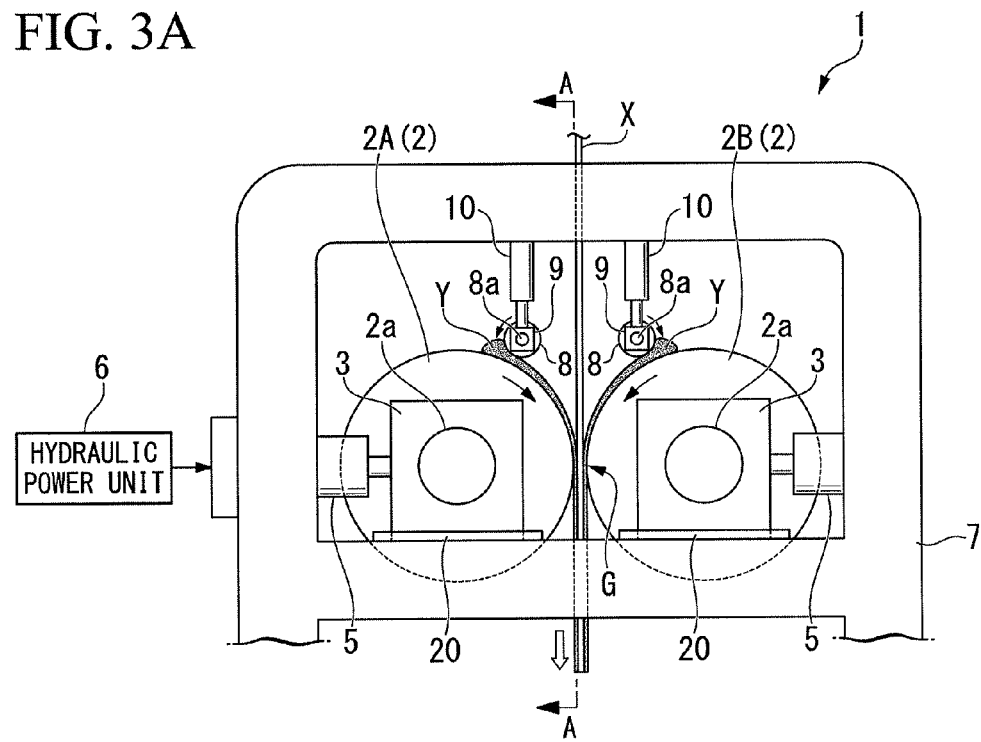
FIG. 3A is a schematic configuration diagram showing a main section of a modification of the powder-rolling device in the embodiment of the present invention, viewed from the rotation axis direction of a rolling roll.

An embodiment of a powder-rolling device and a powder-rolling method relating to the present invention is described below with reference to the drawings. In the following drawings, the scale of each member is appropriately changed so that each member has a recognizable size. In addition, the up-and-down direction in FIGS. 1A, 3A is the same as the vertical direction of the device.
(The Configuration of the Powder-Rolling Device)

A powder-rolling device 1 of this embodiment is used in the process of producing a clad sheet in which a clad layer is formed so as to be attached to both surfaces of a sheet-shaped base material formed of metal, the clad layer, for example, functioning as a brazing filler metal layer. That is, the powder-rolling device 1 attaches powder material as the formation material of the clad layer, to both surfaces of the base material.

Figure 1B:
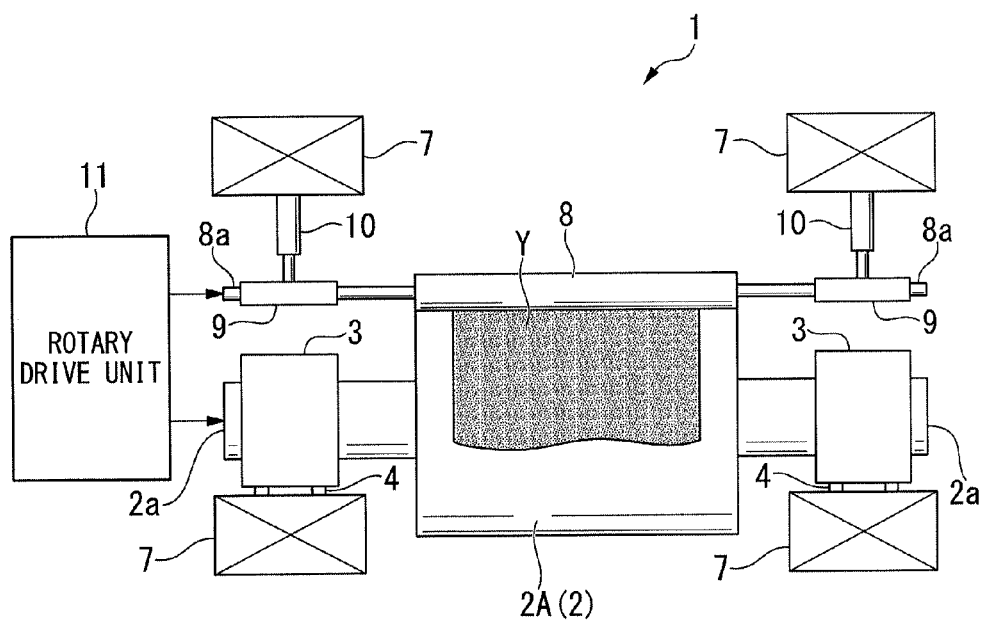
FIG. 1B is a cross-sectional view along the line A-A in FIG. 1A.

As shown in FIGS. 1A, 1B, the powder-rolling device 1 of this embodiment includes rolling rolls 2, rolling roll chocks 3, linear guides 4, rolling roll hydraulic cylinders 5, a hydraulic power unit 6, a housing frame 7 (support frame), preliminary press rolls 8, preliminary press roll chocks 9, preliminary press roll hydraulic cylinders 10 (support device, pressure cylinder), and a rotary drive unit 11.

In addition, not shown in FIGS. 1A, 1B, the powder-rolling device 1 of this embodiment further includes a sending device to send the base material while supporting a coil in which the base material is wound, a transfer device to transfer the base material, a powder material supply device to supply the powder material to the circumferential surfaces of the rolling rolls, a controller to comprehensively control the powder-rolling device 1, and the like.

The rolling rolls 2 roll the base material and the powder material at the same time, thereby attaching the powder material to the base material by pressure.

In the powder-rolling device 1 of this embodiment, as shown in FIG. 1A, two rolling rolls 2A, 2B are configured to be a pair. The two rolling rolls 2A, 2B are disposed so as to be opposite to each other, so that the circumferential surfaces thereof face each other. In addition, as shown in FIG. 1A, the two rolling rolls 2A, 2B are disposed so that their rotation axes are parallel to each other and their levels are the same.

In the powder-rolling device 1 of this embodiment, the base material X is supplied so as to pass between the two rolling rolls 2A, 2B downward from above, and the powder material Y is attached to the surfaces of the base material X by pressure, at the gap G between the two rolling rolls 2A, 2B.

The rolling roll chock 3 is provided in the shaft 2a on each end of the rolling rolls 2, and supports the shaft 2a rotatably. Each of the rolling roll chocks 3 includes bearings directly attached to the shaft 2a.

The linear guides 4 support the rolling roll chocks 3 movably in the lined direction (the left-and-right direction in FIG. 1A) of the rolling rolls 2A, 2B.

Specifically, the linear guides 4 are disposed below the rolling roll chocks 3, and support the rolling roll chocks 3 movably in the lined direction of the rolling rolls 2A, 2B.

The rolling roll hydraulic cylinders 5 support the rolling roll chocks 3 from the outsides thereof in the lined direction of the rolling rolls 2A, 2B, and apply loads to the rolling rolls 2A, 2B so that they approach each other.

The hydraulic power unit 6 extends the rolling roll hydraulic cylinders 5 provided near the rolling roll 2A, and thereby regulates the loads applied to the rolling rolls 2A, 2B.

The housing frame 7 is a support structure which supports the rolling rolls 2, the rolling roll chocks 3, the linear guides 4, the rolling roll hydraulic cylinders 5, the hydraulic power unit 6, the preliminary press rolls 8, the preliminary press roll chocks 9, and the preliminary press roll hydraulic cylinders 10.

As shown in FIGS. 1A, 1B, the housing frame 7 supports the rolling roll chocks 3 though the linear guides 4. That is, the housing frame 7 in this embodiment slidably supports the rolling roll chocks 3 though the linear guides 4.

In addition, the rolling roll hydraulic cylinders 5 are attached to the housing frame 7, and are disposed between the housing frame 7 and the rolling roll chocks 3.

The preliminary press rolls 8 press the powder material Y which has been supplied onto the rolling rolls 2 from the powder material supply device (not shown), against the circumferential surfaces of the rolling rolls 2 before the powder material Y reaches the gap G, preliminarily applying pressure to the powder material Y, and thereby form powder layers composed of the powder material Y having uniform thickness, on the circumferential surfaces of the rolling rolls 2.

In addition, the preliminary press rolls 8 can change the thickness or the density of the powder layers formed on the circumferential surfaces of the rolling rolls 2, by the pressing pressure by the preliminary press roll hydraulic cylinders 10 and the rotation speed of the preliminary press rolls 8, and thereby control the amount of supply of the powder material Y sent to the gap G.

The preliminary press roll chock 9 is provided in the shaft 8a on each end of the preliminary press rolls 8, and rotatably supports the shaft 8a.

Each of the preliminary press roll chocks 9 includes bearings directly attached to the shaft 8a.

The preliminary press roll hydraulic cylinders 10 support the preliminary press roll chocks 9 from above, and press the preliminary press rolls 8 to the circumferential surfaces of the rolling rolls 2. The preliminary press roll hydraulic cylinders 10 are fixed to the housing frame 7.

In the powder-rolling device 1 of this embodiment, the preliminary press roll hydraulic cylinders 10 support the preliminary press rolls 8 so as to be able to move in the direction to approach the circumferential surfaces of the rolling rolls 2 and to be separated therefrom, so that the loads applied to the preliminary press rolls 8 are always maintained at the set value which has been set beforehand.

That is, in the powder-rolling device 1 of this embodiment, it is possible to move the positions of the preliminary press rolls 8 relative to the circumferential surfaces of the rolling rolls 2, so that the loads applied to the preliminary press rolls 8 are always maintained at the set value which has been set beforehand. In other words, it is possible to move the positions of the preliminary press rolls 8 so that the pressures applied to the preliminary press roll hydraulic cylinders 10 are held constant.

As a pressure medium to operate the preliminary press roll hydraulic cylinders 10, a liquid such as oil or a gas such as air can be adopted, and every medium capable of generating pressure can be adopted.

The rotary drive unit 11 rotationally drives the rolling rolls 2 and the preliminary press rolls 8. The rotary drive unit 11 is connected to each rolling roll 2 and each preliminary press roll 8.

(The Operation of the Powder-Rolling Device)

Next, the operation (powder-rolling method) of the powder-rolling device 1 of this embodiment having the above-described configuration is described below.

The base material X is supplied to the gap G of the rolling rolls 2 from above, and the powder material Y is supplied from the powder material supply device (not shown) to the circumferential surfaces of the rolling rolls 2 (first step).

The powder material Y which has been supplied onto the circumferential surfaces of the rolling rolls 2 is pressed to the circumferential surfaces of the rolling rolls 2 by the preliminary press rolls 8, receiving pressure, and thereby the powder layers having uniform thickness are formed on the circumferential surfaces of the rolling rolls 2 (second step). Thereafter, the powder material Y formed into the powder layers is inserted between the rolling rolls 2 together with the base material X, and is attached to the surfaces of the base material X by pressure (third step).

At this time, if the powder material (powder material having a large grain diameter as single, or powder material having a large grain diameter in appearance by agglomeration) having a larger grain diameter than the width of the gap between the rolling roll 2 and the preliminary press roll 8 is supplied to between the rolling roll 2 and the preliminary press roll 8, since the preliminary press roll 8 is movably supported by the preliminary press roll hydraulic cylinders 10, the preliminary press roll hydraulic cylinders 10 are retracted and the gap between the rolling roll 2 and the preliminary press roll 8 is increased, so that the load applied to the preliminary press roll 8 becomes constant (that is, the load is maintained at the set value thereof). That is, the preliminary press roll 8 is separated from the circumferential surface of the rolling roll 2.

Subsequently, after the powder material having the large grain diameter has passed between the rolling roll 2 and the preliminary press roll 8, the preliminary press roll hydraulic cylinders 10 are extended and the gap between the rolling roll 2 and the preliminary press roll 8 is reduced, so that the load applied to the preliminary press roll 8 becomes constant (that is, the load is maintained at the set value). That is, the preliminary press roll 8 approaches the circumferential surface of the rolling roll 2.

In addition, the operation of the preliminary press roll hydraulic cylinders 10 described above may be controlled by the controller (not shown).

That is, in the powder-rolling device 1 and the powder-rolling method of this embodiment, the position of the preliminary press roll 8 relative to the circumferential surface of the rolling roll 2 is changed so that the load applied to the preliminary press roll 8 becomes the set value which has been set beforehand, the preliminary press roll 8 to press the powder material Y which has been supplied onto the circumferential surface of the rolling roll 2, against the circumferential surface of the rolling roll 2 before the powder material Y is attached to the base material X by pressure.

(The Functions and Effects of this Embodiment)

According to the powder-rolling device 1 and the powder-rolling method of this embodiment described above, when the powder material having a large grain diameter is supplied to between the rolling roll 2 and the preliminary press roll 8, the preliminary press roll 8 is moved in the direction to be separated from the rolling roll 2 by the preliminary press roll hydraulic cylinders 10, depending on the grain diameter of the powder material, so that the load applied to the preliminary press roll 8 becomes the set value which has been set beforehand.

Therefore, even if the powder material having a large grain diameter is supplied to between the rolling roll 2 and the preliminary press roll 8, the load applied to the powder material Y and the preliminary press roll 8 can be prevented from being temporarily increased due to the powder material having the large grain diameter.

Consequently, a great load can be prevented from being temporarily applied to the powder material Y or the preliminary press roll 8, and thereby the powder layer formed by the preliminary press roll 8 can be prevented from becoming non-uniform. As a result, the powder material Y can be properly attached to the base material X by pressure.

According to the powder-rolling device 1 and the powder-rolling method of this embodiment, since the load applied to the powder material Y always becomes constant, it is possible to steady the weight per unit area of the powder material Y composing the powder layers formed on the circumferential surfaces of the rolling rolls 2.

The powder-rolling device 1 of this embodiment adopts the structure that the rolling roll chocks 3 can slide in the lined direction of the rolling rolls 2 by the linear guides 4.

Therefore, even if there is eccentricity in the rolling rolls 2, the distortion of the bearings or the like, the rolling roll chocks 3 move, whereby the effects of the eccentricity in the rolling rolls 2 can be reduced, and the positional relationship between the surface positions at attachment part of the rolling rolls 2 with respect to the base material X, and the housing frame 7 can be held constant.

In the powder-rolling device 1 of this embodiment, the preliminary press roll hydraulic cylinders 10 supporting the preliminary press rolls 8 are provided in the housing frame 7 in which its positional relationship relative to the rolling rolls 2 does not change. Therefore, it is possible to prevent the positional relationship between the rolling rolls 2 and the preliminary press rolls 8 from changing, and to steady the gaps between the rolling rolls 2 and the preliminary press rolls 8.

The preliminary press roll hydraulic cylinder 10 is disposed so as to support the preliminary press roll chock 9 provided in each end of the preliminary press roll 8. Therefore, even if the preliminary press roll 8 and the rolling roll 2 are disposed non-parallel to each other due to the eccentricity in the rolls, the distortion of the bearings or the like, by the operation of each of a pair of the preliminary press roll hydraulic cylinders 10, the preliminary press roll 8 can be moved so as to be parallel to the rolling roll 2, and the gap between the preliminary press roll 8 and the rolling roll 2 can become constant over the length thereof in the axis direction.

(Other Embodiments)

Hereinbefore, the preferable embodiment of the present invention is described with reference to the drawings, but the present invention is not limited to the above-described embodiment. A shape, a combination or the like of each component shown in the above embodiment is illustrative only, and various modifications can be adopted based on a design request or the like within the scope not departing from the gist of the present invention.

For example, in the above embodiment, the structure of using the preliminary press roll hydraulic cylinders 10 as the support device in the present invention is adopted.

Figure 2:
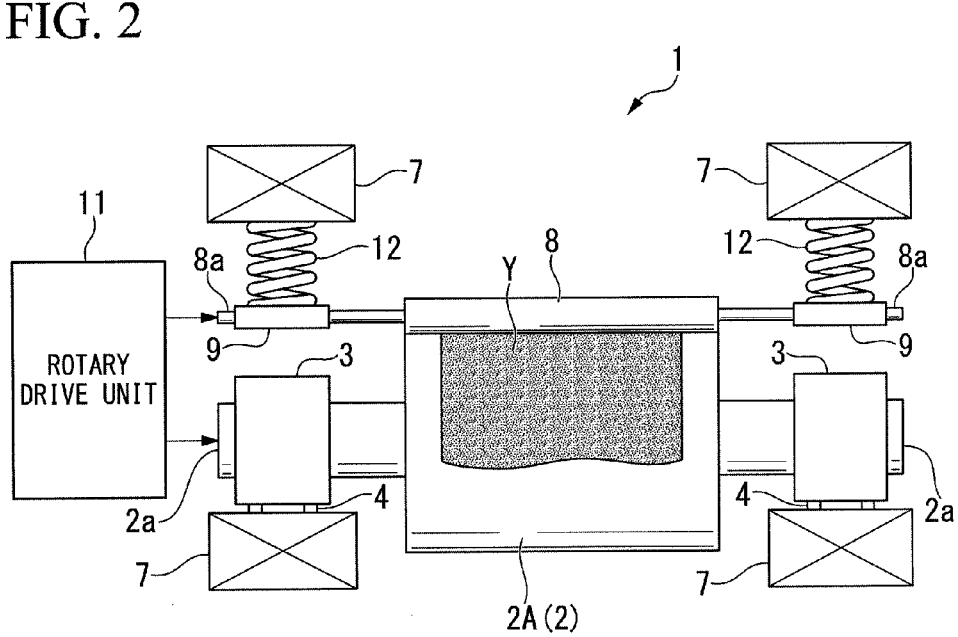
FIG. 2 is a schematic configuration diagram showing a main section of a modification of the powder-rolling device in the embodiment of the present invention.

However, the present invention is not limited to this structure, and the structure of using air cylinders to press the preliminary press roll 8 to the circumferential surface of the rolling roll 2 instead of the preliminary press roll hydraulic cylinders 10 may be adopted. In addition, for example, as shown in FIG. 2, the structure of using springs 12 (support device, elastic member) to press the preliminary press roll 8 to the circumferential surface of the rolling roll 2 instead of the preliminary press roll hydraulic cylinders 10 may be adopted. In addition, the structure of using various elastic members such as rubber instead of the springs 12 may be adopted. Furthermore, the structure (an electric motor, a ball screw or the like) capable of movable supporting the preliminary press roll 8 may be used as the support device in the present invention.

For example, a load cell may be disposed between the preliminary press roll hydraulic cylinder 10 and the preliminary press roll chock 9, and may be configured to detect the load applied to the preliminary press roll 8.

In a case where the load applied to the preliminary press roll 8 is detected, the pressing pressure to the preliminary press roll 8 may be held constant, by the rotation control of a screw or the like.

In a case where the load applied to the preliminary press roll 8 is detected using a sensor such as the above load cell, the detection results thereof may be inputted into the controller (not shown), and the controller may control the operation of the preliminary press roll hydraulic cylinders 10 or the rotation speed of the preliminary press roll 8, based on the inputted detection results. By this control, the load applied to the preliminary press roll 8 may be regulated so as to become the set value which has been set beforehand.

Figure 3B:
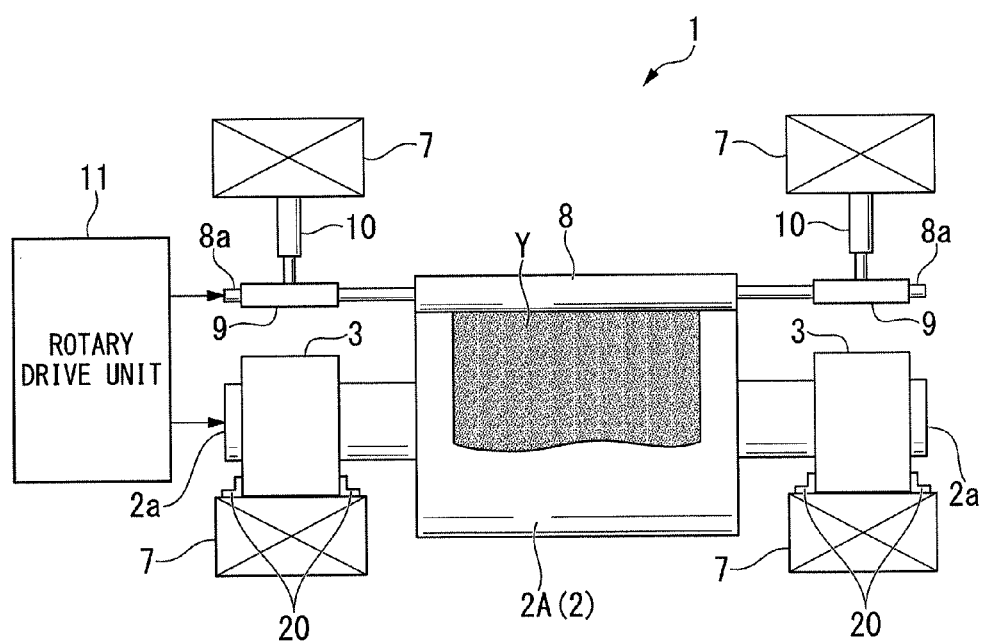
FIG. 3B is a cross-sectional view along the line A-A in FIG. 3A.

For example, the linear guides 4 in the above embodiment may be removed, as shown in FIGS. 3A, 3B, the rolling roll chocks 3 may be directly placed on the frame 7, and the rolling roll chocks 3 may be configured to be able to slide at the position between a pair of rail members 20 having an L-shape cross section or the like.

In the above embodiment, the powder material Y is supplied to each surface in both sides of the base material X. However, the powder-rolling device and the powder-rolling method of the present invention may adopt the configuration that the powder material Y is supplied only to the surface in one side of the base material X. In this case, the powder material Y is supplied to the circumferential surface of one of the rolling rolls 2.

INDUSTRIAL APPLICABILITY

The present invention can be widely applied to a powder-rolling device and a powder-rolling method to attach powder to a base material by pressure.

DESCRIPTION OF REFERENCE SIGNS

1 Powder-rolling device
2, 2A, 2B Rolling roll
3 Rolling roll chock
4 Linear guide
7 Housing frame (support frame)
8 Preliminary press roll
9 Preliminary press roll chock
10 Preliminary press roll hydraulic cylinder (support device, pressure cylinder)
12 Spring (support device, elastic member)
G Gap of mill rolls
X Base material
Y Powder material

The invention claimed is:

1. A powder-rolling method comprising:
a first step of supplying powder material to a circumferential surface of at least one rolling roll of a pair of rolling rolls;
a second step, after the first step, in which a preliminary press roll provided in a different position from that of the rolling rolls presses the powder material which has been supplied onto the circumferential surface of a rolling roll, to the circumferential surface of the rolling roll; and
a third step, after the second step, of inserting a sheet-shaped base material together with the powder material between the pair of rolling rolls, thereby attaching the powder material to the base material by pressure,
wherein, in the second step, the preliminary press roll is moved so as to approach the circumferential surface of the rolling roll and to be separated therefrom, and wherein a predetermined load is applied to the preliminary press roll.

2. A powder-rolling device comprising:
a pair of rolling rolls to attach powder material to a sheet-shaped base material by pressure;
a preliminary press roll provided in a different position from that of the rolling rolls and arranged to press the powder material which has been supplied onto a circumferential surface of a rolling roll, to the circumferential surface of the rolling roll, before the powder material is attached to the base material by pressure; and a support device supporting the preliminary press roll movable in a direction to approach the circumferential surface of the rolling roll and to be separated therefrom, said support device applying a predetermined load to the preliminary press roll.

3. The powder-rolling device according to claim 2, wherein the support device includes a pressure cylinder to press the preliminary press roll to the circumferential surface of the rolling roll.

4. The powder-rolling device according to claim 2, wherein the support device includes an elastic member to press the preliminary press roll to the circumferential surface of the rolling roll.

5. The powder-rolling device according to claim 2, further comprising:

roll chocks supporting the rolling rolls; and a support frame supporting the roll chocks slidably, wherein the support device is attached to the support frame.

6. A powder-rolling device comprising:

a pair of rolling rolls to attach powder material to a sheet-shaped base material by pressure;

first and second preliminary press rolls provided in different positions from those of the rolling rolls and each arranged to press the powder material which has been supplied onto a circumferential surface of a respective rolling roll, to the circumferential surface of the corresponding rolling roll, before the powder material is attached to the base material by pressure; and first and second support devices each supporting a respective one of the preliminary press rolls to be movable in a direction to approach the circumferential surface of the corresponding rolling roll and to be separated therefrom, said support devices each applying a predetermined load to the corresponding preliminary press roll.

* * * * *